(12) United States Patent
Pokotylo (10) Patent No.: US 8,778,435 B2
(45) Date of Patent: Jul. 15, 2014

(54) APPARATUS AND METHODS FOR REHEATING WEDGE SHAPED FOOD PRODUCTS, SUCH AS ONE OR MORE PIZZA SLICES

(76) Inventor: John C. Pokotylo, Colts Neck, NJ (US)

( * ) Notice: Subject to any disclaimer, the term of this patent is extended or adjusted under 35 U.S.C. 154(b) by 125 days.

(21) Appl. No.: 13/426,370

(22) Filed: Mar. 21, 2012

(65) Prior Publication Data

US 2012/0244270 A1  Sep. 27, 2012

Related U.S. Application Data (60) Provisional application No. 61/466,406, filed on Mar. 22, 2011.

(51) Int. Cl.
*A47J 43/28* (2006.01)

(52) U.S. Cl.
USPC .......... 426/523; 99/449; 99/450; 99/DIG. 15; 294/168; 294/169

(58) Field of Classification Search
CPC ...... A47J 43/288; A47J 27/00; A47G 21/045; A21B 3/003; A21B 3/131; A21B 5/00; A21C 15/04
USPC ..................... 426/523; 99/449–450, DIG. 15; 294/9–10, 32, 34, 167–169; D7/361, D7/674, 688; 30/114
See application file for complete search history.

(56) References Cited

U.S. PATENT DOCUMENTS

| | | | |
|---|---|---|---|
| 1,424,389 A * | 8/1922 | Wyatt | 30/304 |
| 1,526,397 A * | 2/1925 | Thornton | 220/23.2 |
| 1,612,367 A * | 12/1926 | Fulton | 294/7 |
| 1,637,227 A * | 7/1927 | McDaniel | 294/33 |
| 1,931,388 A * | 10/1933 | Ling | 30/114 |
| 2,023,521 A * | 12/1935 | Furnas | 294/33 |
| 2,446,629 A * | 8/1948 | Brown et al. | 206/551 |

(Continued)

FOREIGN PATENT DOCUMENTS

| | | |
|---|---|---|
| CN | 2407699 | 11/2000 |
| FR | 2734466 | 11/1996 |

OTHER PUBLICATIONS

PCT/ISA/220, "Notification of Transmittal of the International Search Report and the Written Opinion of the International Searching Authority, or the Declaration" for PCT/US2012/030040, mailed Jun. 15, 2012 (1 pg.).

(Continued)

*Primary Examiner* — Drew E Becker
(74) *Attorney, Agent, or Firm* — John C. Pokotylo; Straub & Pokotylo (57) ABSTRACT

Apparatus for heating a wedge-shaped food product, such as one or more slices of pizza, includes an assembly and a handle mechanically connected with the assembly. The assembly includes a first arm including a side wall and a floor, and a second arm including a side wall and a floor. The second arm is pivotably connected with the first arm such that the wedge-shaped food product can be held between the first arm and the second arm with the wedge-shaped food product being supported by the floors of the first and second arms and abutting the side walls of the first and second arms. Additional supports may be provided between the arms. The handle may be removeably connected with the assembly, for example, via a riser.

18 Claims, 12 Drawing Sheets

(56) References Cited

U.S. PATENT DOCUMENTS

| | | | | |
|---|---|---|---|---|
| 2,546,800 | A * | 3/1951 | Thiac et al. | 99/645 |
| 2,555,690 | A * | 6/1951 | Guerra | 30/114 |
| 2,598,789 | A * | 6/1952 | Harrell | 99/645 |
| 2,613,979 | A * | 10/1952 | Stillabower | 294/34 |
| 2,617,350 | A * | 11/1952 | Shol | 99/645 |
| 2,622,912 | A * | 12/1952 | Schroeder | 294/173 |
| 2,664,810 | A * | 1/1954 | Halbriter | 99/516 |
| 2,716,066 | A * | 8/1955 | Baker | 99/516 |
| 2,731,663 | A * | 1/1956 | Thompson | 16/422 |
| 2,804,335 | A * | 8/1957 | Stillgebauer | 294/7 |
| 2,841,868 | A * | 7/1958 | O'Brien | 30/114 |
| 2,862,754 | A * | 12/1958 | Forcia et al. | 294/7 |
| 3,023,043 | A * | 2/1962 | Ragains | 294/31.1 |
| 3,065,017 | A * | 11/1962 | Serio | 294/31.1 |
| 3,251,521 | A * | 5/1966 | Fay | 294/161 |
| 3,510,163 | A * | 5/1970 | Malone et al. | 294/29 |
| 3,677,168 | A * | 7/1972 | Bell | 99/645 |
| 3,730,579 | A * | 5/1973 | Mock | 294/8 |
| 3,888,001 | A * | 6/1975 | Gilbart-Smith | 30/114 |
| 4,373,636 | A * | 2/1983 | Hoffman | 206/551 |
| 4,592,139 | A * | 6/1986 | Huang | 30/114 |
| 4,637,138 | A * | 1/1987 | Piche | 30/114 |
| 4,877,609 | A * | 10/1989 | Beck et al. | 426/87 |
| 4,890,549 | A * | 1/1990 | Steiner et al. | 99/450 |
| 5,551,741 | A * | 9/1996 | LaBoccetta | 294/7 |
| 5,774,937 | A * | 7/1998 | Caminos | 16/425 |
| 5,774,990 | A * | 7/1998 | McGrey et al. | 30/114 |
| 5,865,489 | A * | 2/1999 | Kobas | 294/29 |
| 6,150,635 | A * | 11/2000 | Hannon et al. | 219/386 |
| 6,287,619 | B1 * | 9/2001 | Khan | 426/523 |
| 6,381,851 | B1 * | 5/2002 | Meyer | 30/114 |
| 7,409,764 | B2 * | 8/2008 | Akopyan | 30/114 |
| D625,155 | S * | 10/2010 | Deshpande | D7/673 |
| 7,913,396 | B2 * | 3/2011 | Wei | 30/114 |
| 2007/0170183 | A1 * | 7/2007 | Hannan et al. | 220/23.4 |
| 2007/0261568 | A1 * | 11/2007 | Smothers | 99/424 |
| 2008/0203746 | A1 * | 8/2008 | Cunningham et al. | 294/7 |
| 2012/0280525 | A1 * | 11/2012 | Tharp | 294/176 |

OTHER PUBLICATIONS

PCT/ISA/210, "International Search Report" for PCT/US2012/030040, mailed Jun. 15, 2012 (2 pgs.).

PCT/ISA/237, "Written Opinion of the International Searching Authority" for PCT/US2012/030040, mailed Jun. 15, 2012 (3 pgs.).

* cited by examiner

APPARATUS AND METHODS FOR REHEATING WEDGE SHAPED FOOD PRODUCTS, SUCH AS ONE OR MORE PIZZA SLICES

§0. RELATED APPLICATION

This application claims the benefit of U.S. Provisional Patent Application Ser. No. 61/466,406 (incorporated herein by reference and referred to as "the '406 provisional"), filed on Mar. 22, 2011, titled "APPARATUS FOR REHEATING FOOD PRODUCTS SUCH AS PIZZA SLICE(S)," and listing John C. POKOTYLO as the inventor. The present invention is not limited to any requirements of the particular embodiments described in the '406 provisional.

§1. BACKGROUND OF THE INVENTION

§1.1 Field of the Invention

The present invention concerns apparatus for reheating food products, such as one or more slices of pizza for example.

§1.2 Background Information

Food products such as pizzas are often cooked in a circular geometry (as "pies") and cut into wedge-shaped slices. Pizzas typically come in diameters such as 10", 12", 14" and 16", though other diameters are possible. Pizzas are typically cut into eight (8) wedges of approximately 45 degrees, though they may be cut into other (typically even) numbers of wedge-shaped slices.

Often, one or more slices of pizza are left over from a pizza pie. These left over slice(s) are typically saved, to be reheated and eaten later. Unfortunately, known methods of reheating left over pizza slices are not entirely satisfactory.

Some people advocate reheating pizza in a frying pan. However, the frying pan needs to be large enough to accommodate one or more slices, and the crust and toppings might reach the desired temperature at different times.

Some people advocate reheating pizza in a microwave. Although this method is fast, the crust is generally soggy when this method is used.

Ovens, and toaster ovens in particular, are popular ways of reheating pizza. Two methods are normally employed when using an oven, such as a toaster oven for example. Under the first method, the pizza slice(s) is placed directly on an oven rack. Although this method can provide a crisp crust, toppings can fall off an edge of the slices, grease, and/or oil can drip from an edge of the slice(s), and/or melted cheese can drip from an edge of the slices. This can not only dirty the oven, but can also damage heating elements of an electric oven. Under the second method, the pizza slice(s) is heated on a tray or on foil inside the oven. Although this eliminates, or at least reduces, the problems of toppings, grease, oil, and/or cheese dripping onto the oven, when this method is used, the crust can become soggy, or at least does not crisp as when the slice(s) are placed on an oven rack. In addition, toppings, cheese, etc. can still fall onto the foil or sheet, wasting food and/or requiring additional cleanup.

§2. SUMMARY OF THE INVENTION

Apparatus for heating a wedge-shaped food product, such as one or more slices of pizza, includes an assembly and a handle mechanically connected with the assembly. The assembly includes a first arm including a side wall and a floor, and a second arm including a side wall and a floor. The second arm is pivotably connected with the first arm such that the wedge-shaped food product can be held between the first arm and the second arm with the wedge-shaped food product being supported by the floors of the first and second arms and abutting the side walls of the first and second arms. Additional supports may be provided between the arms. The handle may be removeably connected with the assembly, for example, via a riser.

§3. BRIEF DESCRIPTION OF THE DRAWINGS

FIG. 7A illustrates a top view of an exemplary arm including a pivot slot consistent with the present invention, while

FIGS. 15A-17B illustrate various exemplary removable handles consistent with the present invention.

§4. DETAILED DESCRIPTION

The present invention may involve novel methods and apparatus for heating wedge-shaped food products, such as one or more pizza slices. The following description is presented to enable one skilled in the art to make and use the invention, and is provided in the context of particular applications and their requirements. Thus, the following description of embodiments consistent with the present invention provides illustration and description, but is not intended to be exhaustive or to limit the present invention to the precise form disclosed. Various modifications to the disclosed embodiments will be apparent to those skilled in the art, and the general principles set forth below may be applied to other embodiments and applications. No element, act or instruction used in the description should be construed as critical or essential to the present invention unless explicitly described as such. Also, as used herein, the article "a" is intended to include one or more items. Where only one item is intended, the term "one" or similar language is used. Thus, the present invention is not intended to be limited to the embodiments shown and the inventor regards his invention as any patentable subject matter described.

§4.1 Arms with an Adjustable Angle

Figure 1:
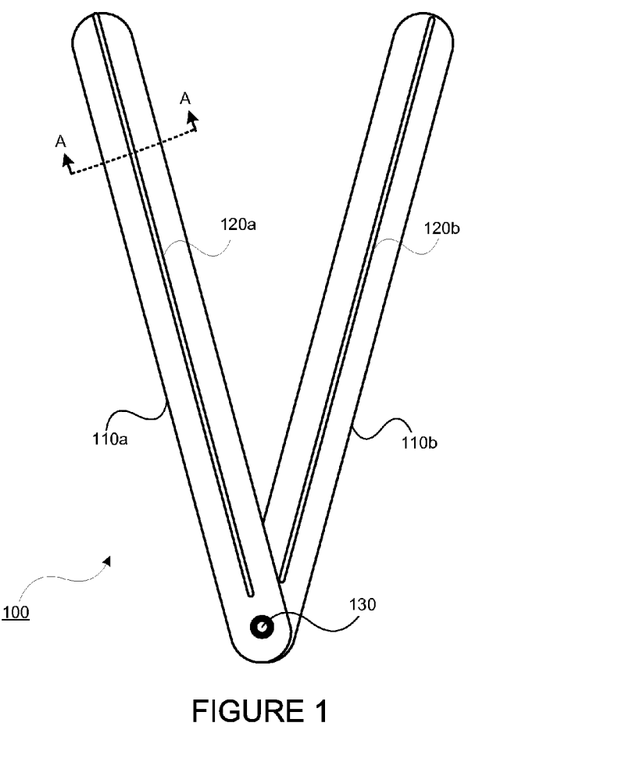
FIG. 1 illustrates two adjustable arms of an exemplary apparatus consistent with the present invention.

At least some exemplary apparatus consistent with the present invention include two arms, joined (e.g., at one end) such that they can pivot or rotate with respect to each other. For example, FIG. 1 illustrates an assembly 100 including two arms 110*a* and 110*b* which are pivotably connected at point 130 (e.g., with a rivet, a nut and bolt, or the like).

Preferably, the joined ends permit an angle between the two arms to be adjusted (e.g., to accommodate one or more slices of pizza), but holds the angle of the arm (e.g., by means of friction). The ends (or some other part) of the arms may be pivotably fastened by various means, such as, for example, using a rivet, a nut and bolt, etc.

Each of the arms 110 has a side wall 120. When one or more slices of pizza are inserted between the arms 110, the angle between the arms can be adjusted such that the side walls 120 of the arms 110 abut the two side edges of the pizza slice(s) (not shown), while a flange (or floor) portion of each arm 110 supports the pizza slices(s) at their bottom edges.

Note that most of the underside of slice(s) held between the arms 110 is (totally, or substantially) open. This advantageously permits a crisp crust to be obtained. Note also that the side walls 120 of the arms 110 prevent, or help to prevent, toppings, cheese, oil, or grease from running over the sides of the slice(s).

§4.1.1 Details of Exemplary Arms (Cross Sections, Materials, Fasteners, Holes, Etc.)

Figure 2A:
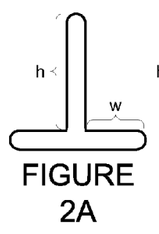
FIGS. 2A-2D illustrate various possible cross-sections of arms of an exemplary apparatus consistent with the present invention.
Figure 2B:
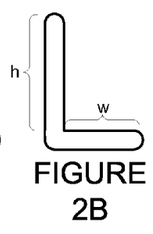
Figure 2C:
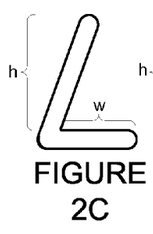
Figure 2D:
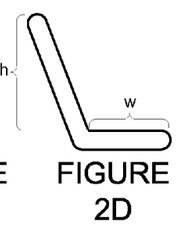
Figure 2E:
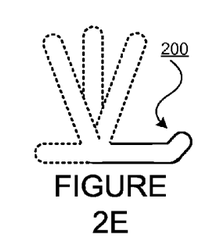
FIG. 2E shows a detail of an exemplary flange portion of an arm.

FIGS. 2A-2D illustrate various possible cross-sections (inverted "T", "L" or right angle, acute angle, and obtuse angle) of arms 110 taken at line A-A of FIG. 1. FIG. 2E shows a detail of an exemplary flange (or floor) portion of an exemplary arm.

In the cross-sections of FIGS. 2A-2D, the bottom edge of the pizza slice(s) are supported by the inside flange (or floor). The edges of the pizza slice(s) abut the side walls.

In some exemplary embodiments consistent with the present invention, the side walls are at least 0.25 inches higher than the thickness of a slice of pizza to be heated. As another example, the side walls may be at least 1.5 times the thickness of a slice of pizza to be heated. The height (h) of the side walls can be chosen based on the food product to be heated.

In some exemplary embodiments consistent with the present invention, the flange (or floor) inside the side wall is approximately 0.25 inches wide, but can range from 0.125 to 0.75 inches wide. Other widths (w) are possible.

As shown in FIG. 2E, an elevation 200 may be provided on the inside edge of the flange (or floor). This elevation 200 may prevent any accumulated oil or grease from dripping down. Alternatively, or in addition, the flange (or floor) may be shaped or angled (not shown) to help hold any oil or grease, and/or direct any oil or grease to a holding area(s). Channels and/or recesses (not shown) may be used in addition to, or instead of the elevation 200.

Figures 3, 4:
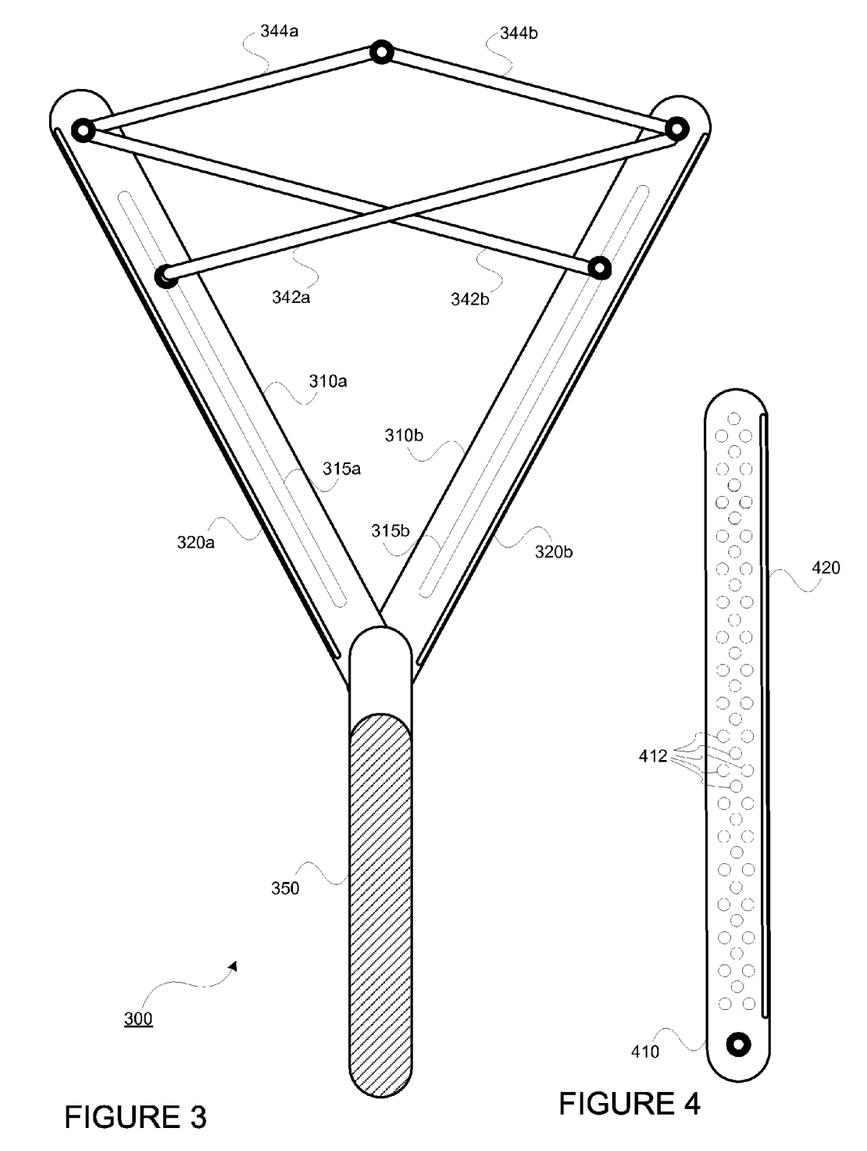
FIG. 3 illustrates an exemplary apparatus including "cross-arm" supports and a handle consistent with the present invention.
FIG. 4 illustrates an arm including holes consistent with the present invention.

As shown in FIG. 4, the arms 410, or at least a portion of the flanges (or floors) of the arms 410, may be provided with holes (or slots, or some other openings) 412 to allow heat to reach the edges of the slice(s) more directly. Although not shown, it may be desirably to use elevations, channels, and/or recesses between the side wall 420 and the holes 412 to keep any oil or grease from entering the holes 412. Alternatively, or in addition, each of the holes 412 may include an elevation (or wall) surrounding it.

The arms may be made from thin, flat metal. However, the arms may be thicker than thin metal gap supports, described in §4.2 below. The metal may be steel or stainless steel for example. In some exemplary embodiments consistent with the present invention, at least the portions of the arm designed to contact the slices may be made of non-stick material (e.g., Teflon, Tefal, Silpat, Lunac, etc.), or provided with a non-stick coating.

The lengths of the arms should be sufficient to reliably support the pizza slice(s), while still being able to fit into an oven (or into a toaster oven). For example, the length of the arms may arms may be 4-10 inches. An apparatus with arms of approximately 8 inches should reliably support a slice(s) from a 16 inch diameter pizza. Note that shorter arms can be used if additional supports (described below) extend beyond the arms (See, e.g., FIG. 12), and/or if the center of gravity of the pizza slice(s) is adequately supported.

§4.2 Gap Supports

If the angle between the arms becomes large, it may be desired to provide additional support under the slices (between the flanges (or floors) of the arms). However, it may be desirable to have the surface area of the bottom of the slices covered by such supports minimized. FIG. 3 illustrates an assembly 300 including thin metal supports 342 and 344 between the arms. The supports 342 can pivot at their top ends and slide and pivot within a slot 315 in the floors of the arms 310 at their bottom ends. The supports 344 pivot with respect to each other at their top ends, and pivot with respect to the arms 310 at their bottom ends. Although not shown, wire or collapsible mesh supports may be provided between the arms. It is desirable, however, that the supports remain substantially flat regardless of the angle of the arms.

Figure 10:
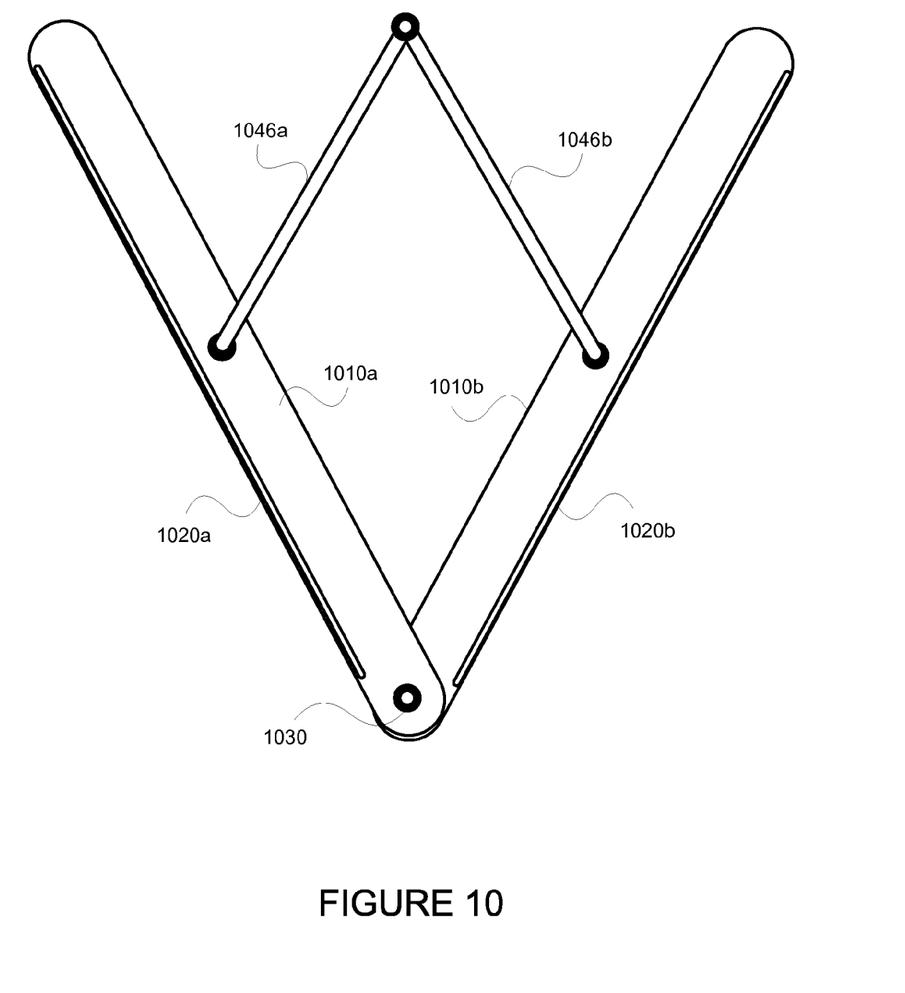
FIGS. 10-13 illustrate various exemplary means for providing additional support between the arms, in apparatus consistent with the present invention.
Figure 11:
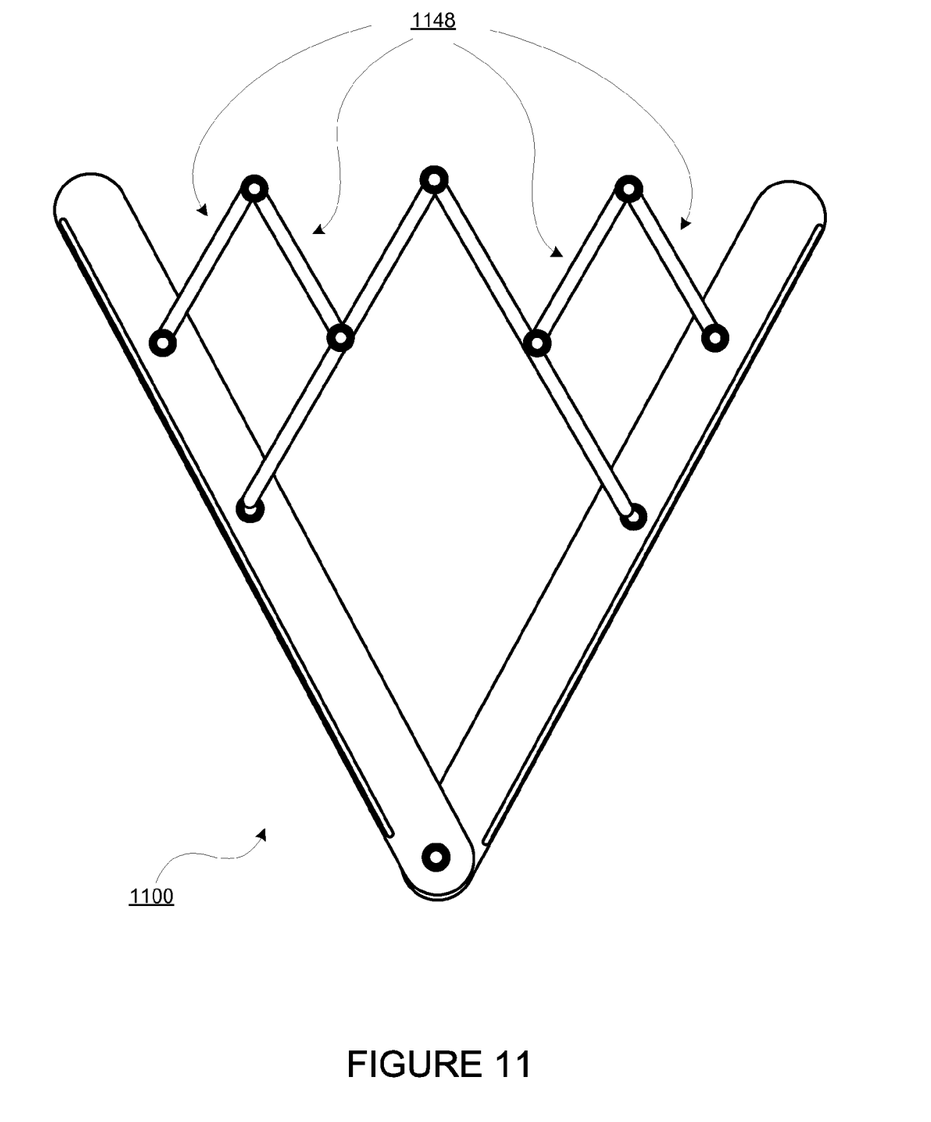
Figure 12:
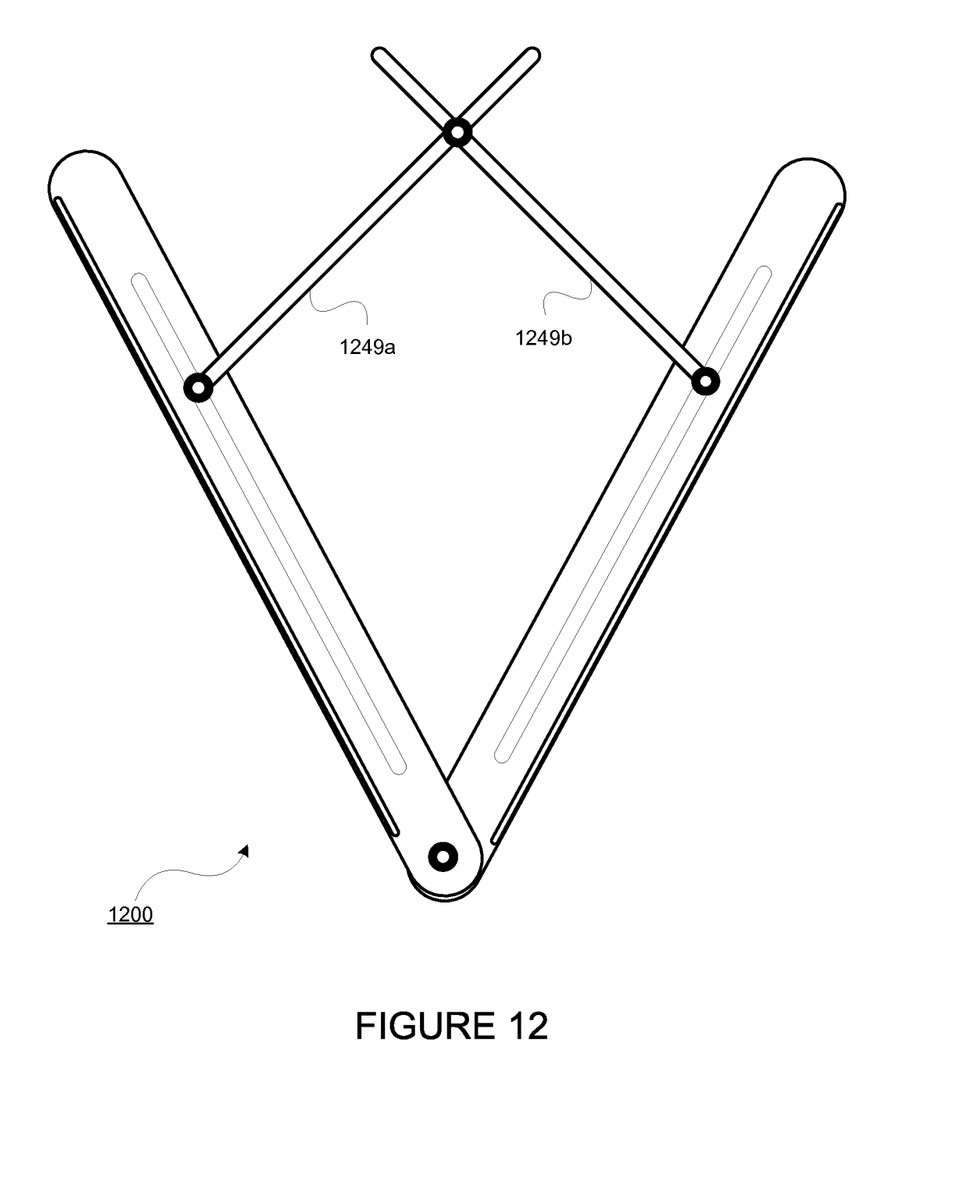
Figure 13:
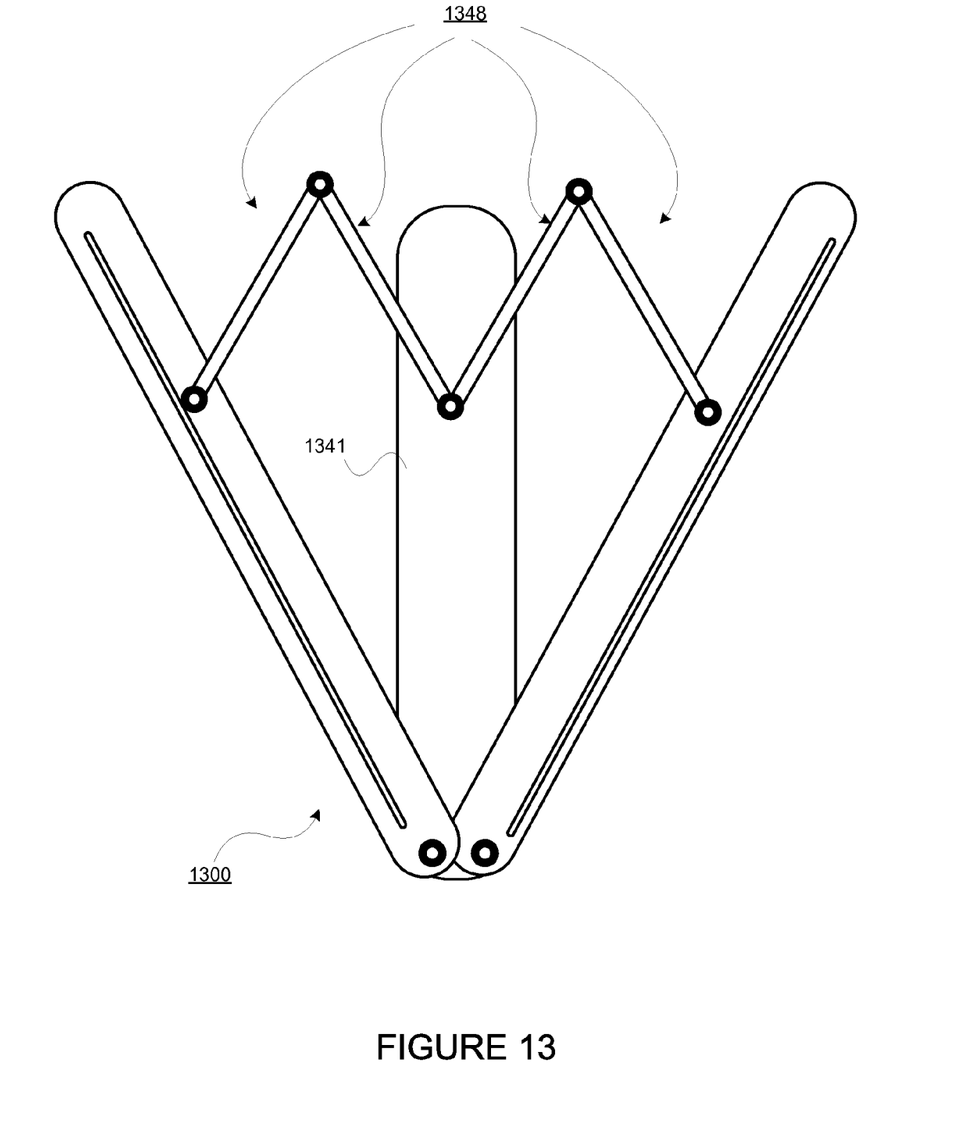

Referring to FIGS. 10-12, in at least some exemplary embodiments consistent with the present invention, thin (e.g., 1/16 of an inch or less), flat metal supports may be provided between the arms. These supports may pivot at one or more of their ends (See, e.g., FIGS. 10 and 11), but can pivot at a point away from their end (See, e.g., FIG. 12). More specifically, in FIG. 10, thin, flat metal supports 1046 are pivotably connected with each other at their top ends, and pivotably connected with the floors of the arms 1010 at their bottom ends. The arms 1010 include side walls 1020 and pivot point 1030. The assembly 1100 of FIG. 11 is similar to that 1000 of FIG. 10, but additional supports 1148 are provided. As shown in FIG. 12, one or more ends of a support 1249 may pivotably slide within a slotted guide in some exemplary embodiments. As also shown in FIG. 12, the supports 1249 can pivot with respect to each other at a point below their top ends. FIG. 13 illustrates a larger thin, flat metal central support 1341 between the two arms, with smaller, thin flat metal supports 1348 provided between the central support 1341 and each of the arms.

The thin, flat metal supports may be held by various fasteners, such as, for example, rivets or the like. Although some of the Figures illustrate slots provided in the floors of the arms, slots may be provided on the supports instead, or in addition.

The metal of the thin, flat metal supports may be steel or stainless steel. In some exemplary embodiments consistent with the present invention, at least the portions of the supports designed to contact the slices may be made of non-stick material (e.g., Teflon, Tefal, Silpat, Lunac, etc.), or provided with a non-stick coating. However, this is less important since the supports will contact the crust area of the slices. Some embodiments consistent with the present invention may use supports made of material other than metal, though such material should be heat resistant.

The gap supports should allow the arms to be adjusted through a range of angles. Preferably, the gap supports should allow the arms to open up to at least 90 degrees, or at least 135 degrees, or at least 180 degrees.

§4.3 Handle

Figure 5:
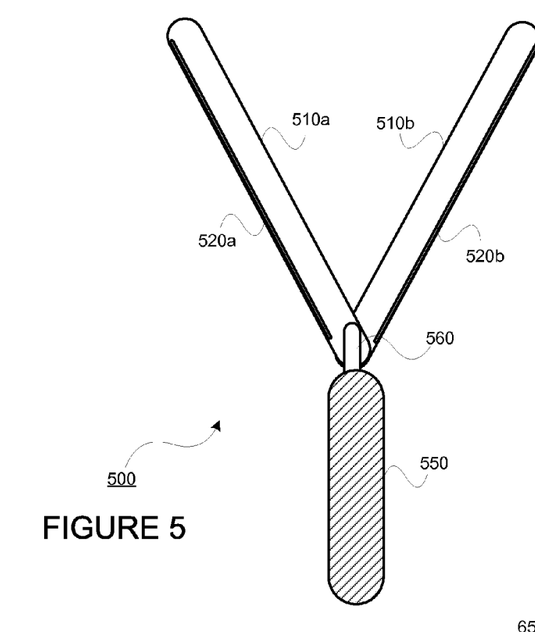
FIGS. 5, 6, 8 and 9 illustrate various apparatus including handles consistent with the present invention.
Figure 6:
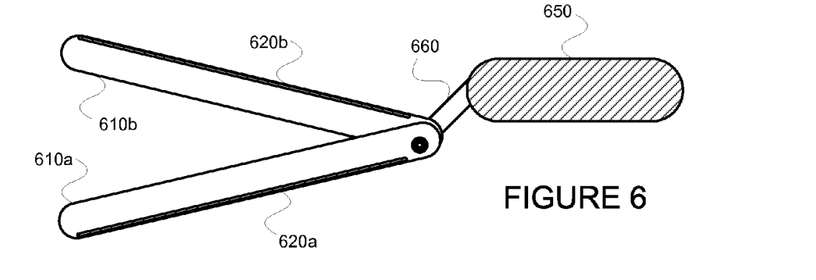
Figure 8:
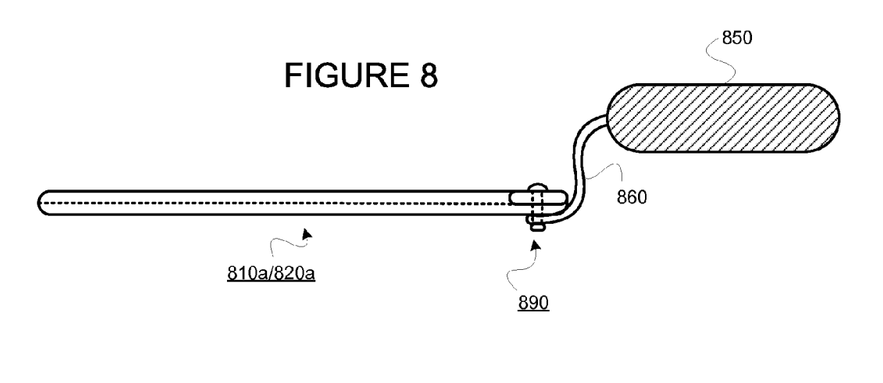
Figure 9:
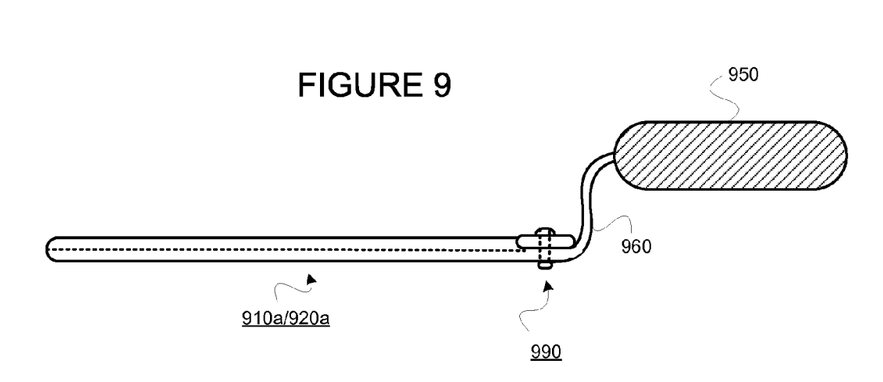

As shown in FIGS. 5, 6, 8 and 9, a handle (550, 650, 850 and 950) may be provided. The handle may preferably include material that does not conduct heat well (e.g., wood, plastic, ceramic). In some embodiments, in which the handle may be close to the heating element of a stove or toaster oven, the handle should be able to withstand high temperatures. As shown in FIGS. 5 and 6, the handle (550 or 650) may be connected to an assembly including arms (510 or 610) via a riser (560 or 660), FIG. 8 illustrates an exemplary embodiment in which a fastener 890 passes through two arms (left arm 810 and side wall 820 shown) and a riser 860, the end of which 860 is accommodated within the handle 850. FIG. 9 illustrates an exemplary embodiment in which a fastener 990 passes through two arms (left arm 910 and side wall 920 shown), one of the arms being integrally formed with the riser 960, the end of which 960 is accommodated with the handle 960.

§4.3.1 Details of Exemplary Handles (Location, Removability, Etc.)

Figure 14A:
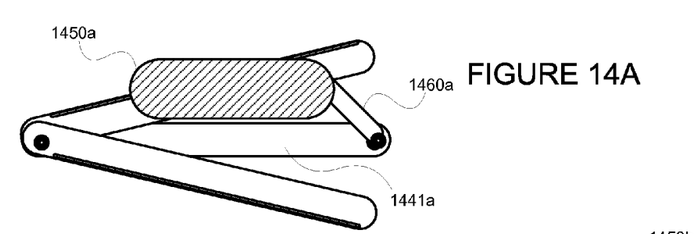
FIGS. 14A-14D illustrate various exemplary handle locations and orientations consistent with the present invention.
Figure 14B:
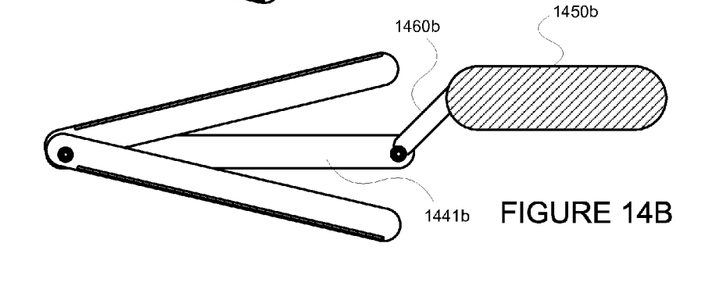
Figure 14C:
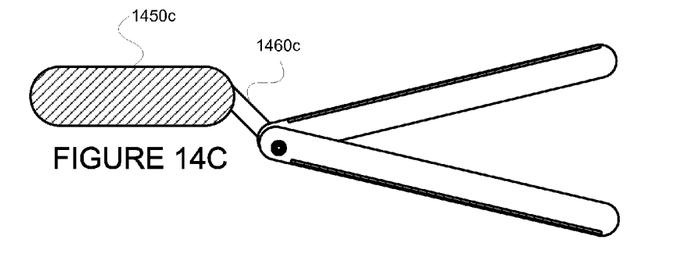
Figure 14D:
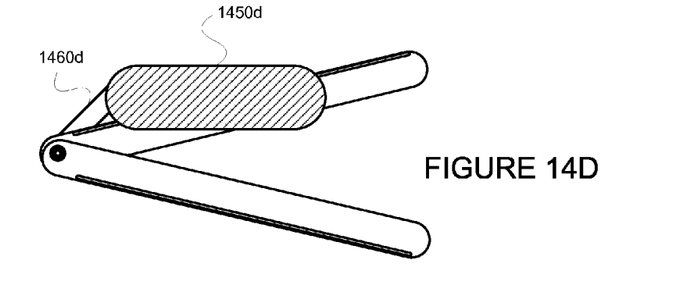

As shown in FIGS. 14A-14D, the handle 1450 (and riser 1460) may be provided on a crust side (outer radius) of the slice(s) (See, e.g., FIGS. 14A and 14B), or on a center point side of the slice(s) (See, e.g., FIGS. 14A and 14D). In FIGS. 14A and 14B, the riser 1460 is connected to a middle support 1441. (Recall, e.g., 1341 of FIG. 13.) Further, the handle 1450 (and riser 1460) may be provided adjacent to the slice(s) (See, e.g., FIGS. 14B and 14C), or over the slice(s) (See, e.g., FIGS. 14A and 14D.) The arrangement of the handles over the slice(s) (Recall FIGS. 14A and 14D) advantageously reduces the footprint of the apparatus and is particularly advantageous for reheating in a smaller oven, such as a toaster oven, especially if the handle is not removable. On the other hand, providing the handle adjacent to the slice(s) (Recall FIGS. 14B and 14C) keeps the user's hand further away from hot toppings on the slice(s). Providing the handle at the center point of the slice(s) (Recall FIGS. 14C and 14D) advantageously permits the slice(s) to be easily slid onto and off of the apparatus (from the open end of the arms).

One potential problem with providing a handle is that most toaster ovens have heating elements at the top and bottom of the oven. The handle may be provided so close to the upper heating element as to become too hot and cause the material of the handle to degrade and/or may become too hot to handle by a user. FIGS. 15A-17B illustrates exemplary removable handles that may be used in an assembly consistent with the present invention.

Figure 15A:
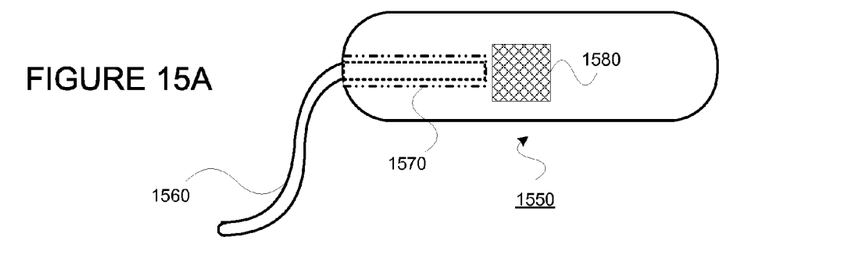
Figure 15B:
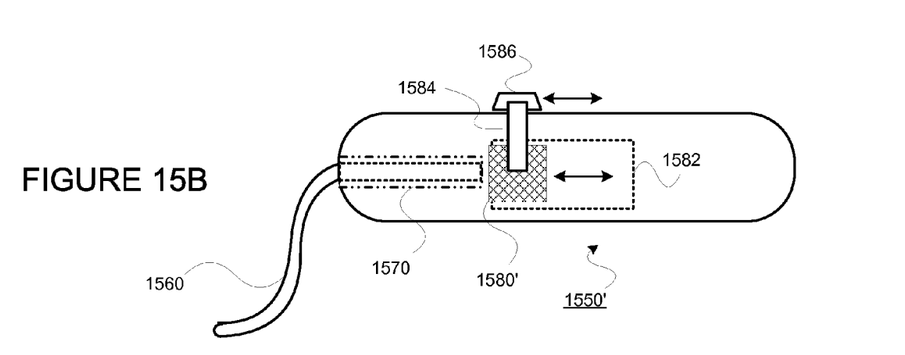

FIG. 15A illustrates a handle 1550 which includes an integral magnet 1580 that can receive and end of the riser 1560 of the arm-riser assembly ("the assembly") within cavity 1570. The assembly can be placed into an oven using the handle. The handle can then be removed from the assembly once the assembly is in the oven. FIG. 15B illustrates a handle 1550' in which the magnet 1580' can be moved forward and backward (see arrow) within a second cavity 1582'. For example, a user might move the magnet 1580' by manipulating a thumb pad 1586 (or the like) connected with the magnet 1580' via post 1584 (or the like). The assembly can be removed from the oven with the handle.

Figure 16:
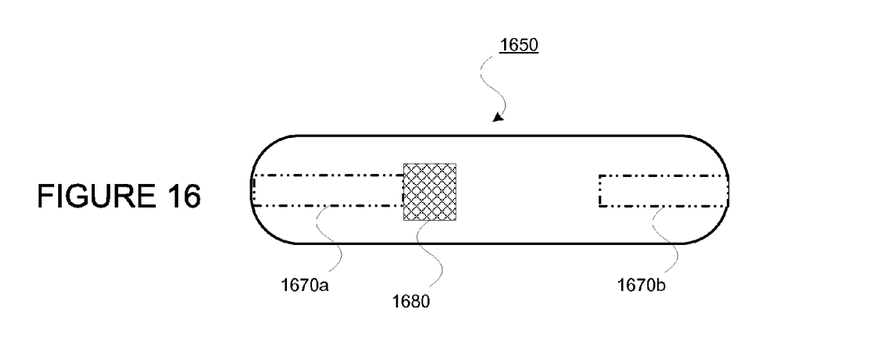

FIG. 16 is similar to FIG. 15A, but includes two cavities 1670a and 1670b, one 1670a providing magnetic attraction via magnet 1680, and the other 1670b without (or with much less) magnetic attraction. Thus, the side of the handle without the magnetic attraction can be used to place the assembly (loaded with pizza slice(s)) in the oven, after which the handle can be removed. Later, the side of the handle with magnetic attraction can be used to remove the assembly (loaded with the pizza slice(s)) from the oven.

Figure 17A:
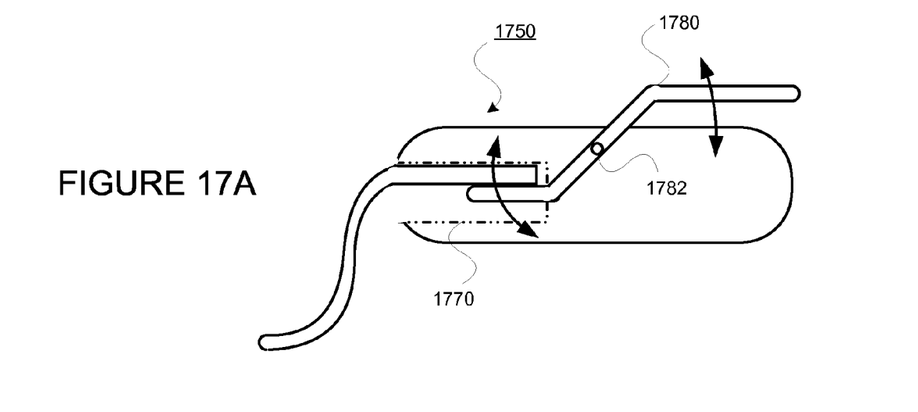
Figure 17B:
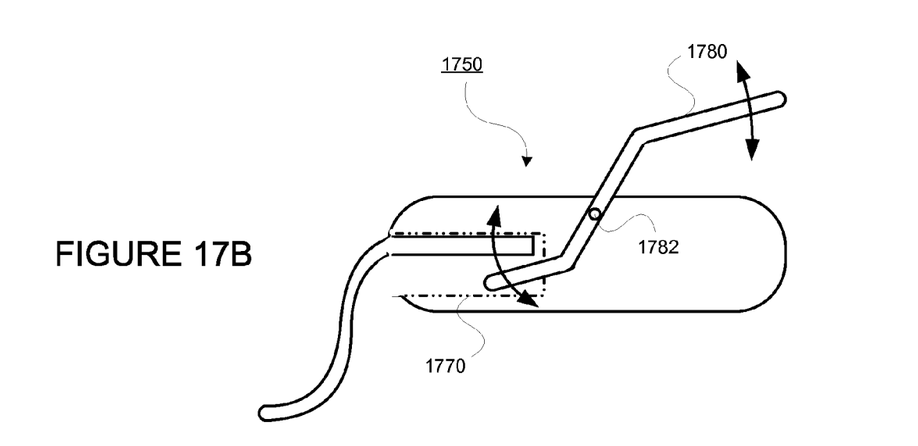

FIGS. 17A and 17B illustrate a handle 1750 with a pivoting (about pivot point 1782) clamp 1780, which can be used to allow the user to grasp the riser of the assembly (See FIG. 17A) or release the riser of the assembly (See FIG. 17B).

Note that although not shown, if the handle is removable, it can be provided with an extended arm to grasp the apparatus from outside the oven. It may be desired to design such an extended arm to minimize the likelihood of electric conduction (or heat) from an electric heating element to the user. Other ways of providing a handle (with or without and extended arm) to permit a riser to be releasably grasped may be used.

In the various embodiments having a removeable handle, the cavity of the handle and the cross-section of the end of the riser should be shaped to avoid unwanted rotation of the assembly with respect to the handle.

§4.4 Refinements, Alternatives and Extensions

The various parts of the assembly and/or the handle may be made of "dishwasher-safe" material.

Figure 7A:
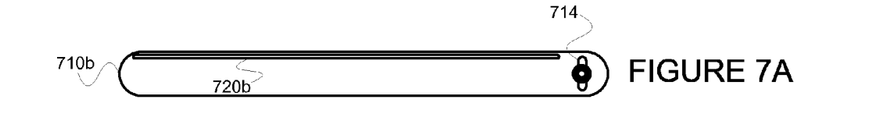
Figure 7B:
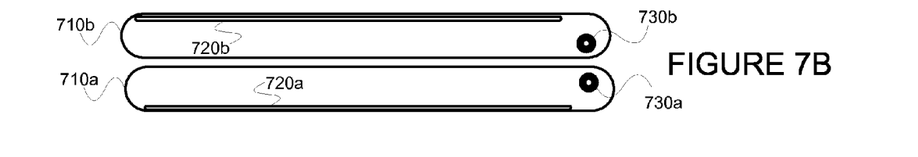
FIG. 7B illustrates a top view of exemplary arms with off-center pivot points, consistent with the present invention.

FIG. 7A illustrates a right arm 710b provided with a slotted pivot 714. This permits the right arm to be folded completely against the left arm (not show), which might not otherwise be possible due to the side walls 720 of the arms 710 interfering with one another. FIG. 7B illustrates right and left arms 710 provided with slightly off-center (away from side walls 720) pivot points 730. This permits the arms 710 to be folded completely, which might not otherwise be possible due to their side walls 720 interfering with one another.

Figure 18:
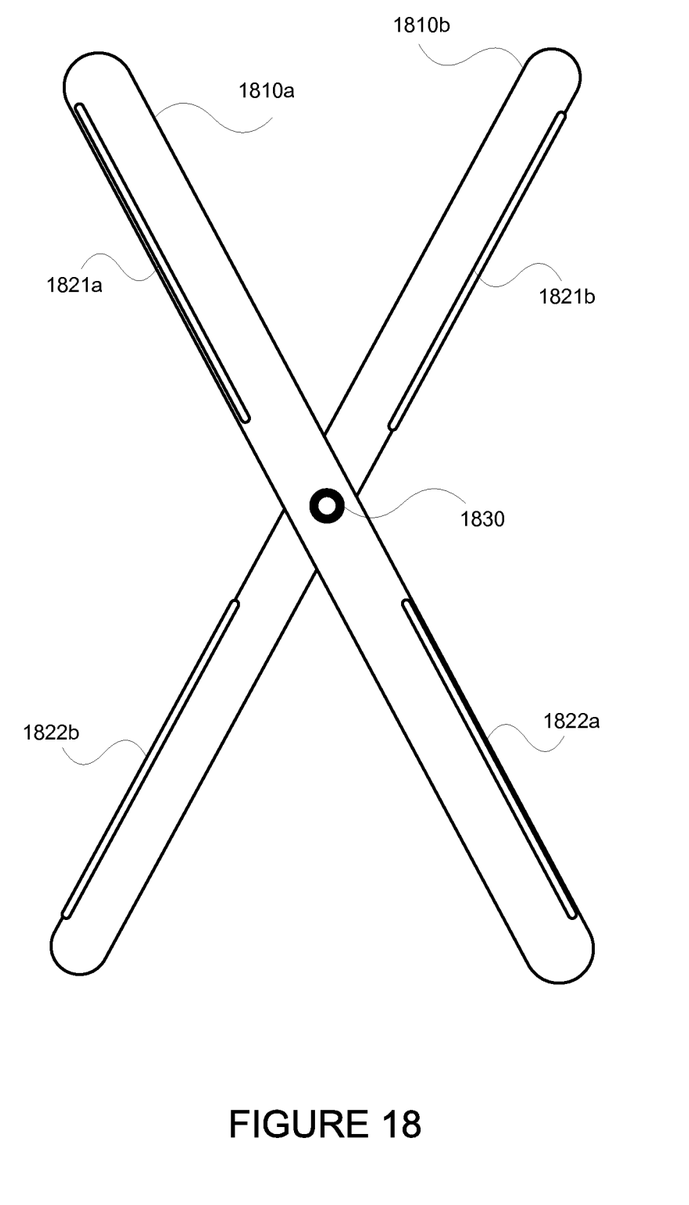
FIG. 18 illustrates an alternative arm arrangement consistent with the present invention.

FIG. 18 illustrates arms 1810, provided with side walls 1820, pivoting about a center point 1830. Although the exemplary embodiments described include two arms, embodiments with more than two arms can be used.

Referring back to FIGS. 8, 9, 15A, 15B, 17A and 17B, although the riser arm shown extends beyond the arms, an alternative riser arm, which extends over the arms (in a "Z" configuration) can advantageously reduce the footprint of the assembly, and is especially useful with a removeable handle.

§4.5 Conclusions

Various exemplary features described above may be combined in various ways that should be apparent, without undue experimentation. Not all of the exemplary features need to be used. It is believed that an arrangement similar to FIG. 14D, where a riser is provided over the slices, and can be removably grasped by the extended arm of a handle provides a pizza slice(s) reheater which advantageously has a small footprint, can be safely grasped from outside the oven, and allows the slice(s) to be slid onto and out of the arms. The arrangement of FIG. 14C provides similarly advantages, though with a slightly larger footprint.

My invention is not limited to any particular embodiment described above, but includes any novel and non-obvious subject matter described above.

What is claimed is:

1. Apparatus comprising:
    a) an assembly including
       1) a first arm including a side wall and a floor,
       2) a second arm including a side wall and a floor, the second arm being pivotably connected with the first arm such that a wedge-shaped food product can be held between the first arm and the second arm with the wedge-shaped food product being supported by the floors of the first and second arms and abutting the side walls of the first and second arms, and
       3) at least two flat supports, each of the at least two flat supports being arranged between the first and second arms; and
    b) a handle, mechanically connected with the assembly.

2. The apparatus of claim 1 wherein the first arm and the second arm are each 4-10 inches in length.

3. The apparatus of claim 1 wherein the first arm and the second arm are each approximately 8 inches in length.

4. The apparatus of claim 1 wherein a floor of at least one of the first arm and the second arm includes a plurality of openings.

5. The apparatus of claim 1 wherein a floor of at least one of the first arm and the second arm includes at least one of an elevation, a channel, or a recess to direct and/or hold fluid.

6. The apparatus of claim 1 wherein
each of the at least two flat supports is pivotable with respect to another of the at least two flat supports.

7. The apparatus of claim 6 wherein each of the at least two flat supports is slideably and pivotably attached with another of the at least two flat supports.

8. The apparatus of claim 1 wherein
each of the at least two flat supports is pivotably attached to at least one of the first and second arms.

9. The apparatus of claim 8 wherein each of the at least two flat supports is slideably and pivotably attached to at least one of the first and second arms.

10. The apparatus of claim 8 wherein the first arm, the second arm, and the at least two flat supports are made of metal.

11. The apparatus of claim 10 wherein the first arm, the second arm, and the at least two flat supports are made of stainless steel.

12. The apparatus of claim 1 wherein the handle is removeably connected with the assembly.

13. The apparatus of claim 1 wherein the assembly further includes (3) a riser, and wherein the handle is removeably connected with the assembly via the riser.

14. The apparatus of claim 13 wherein
the handle includes a pivotable clamp for grasping a portion of the riser.

15. The apparatus of claim 13 wherein the handle includes a magnet for magnetically attracting a portion of the riser.

16. The apparatus of claim 15 wherein the magnet is slideable within the handle such that the magnetically attracted portion of the riser can be released.

17. The apparatus of claim 1 wherein the first arm and the second arm are pivotably connected at points on the first and second arms that permit the first arm to be folded completely against the second arm.

18. The apparatus of claim 1 wherein the first arm and the second arm are pivotably and slideably connected such that the first arm can be folded completely against the second arm.

\* \* \* \* \*